United States Patent [19]
Loret et al.

[11] Patent Number: 4,942,392
[45] Date of Patent: Jul. 17, 1990

[54] OPTICAL DISPLAY DEVICE

[75] Inventors: Marc Loret, Montrouge; Daniel Boutquet, Paris; Yannick Le Pen, Mantes La Jolie, all of France

[73] Assignee: Sayag Electronic, France

[21] Appl. No.: 289,527

[22] Filed: Dec. 27, 1988

Related U.S. Application Data

[63] Continuation of Ser. No. 881,897, Jul. 3, 1986, abandoned.

[30] Foreign Application Priority Data

Jul. 3, 1985 [FR] France .................. 85 10177

[51] Int. Cl.$^5$ ............................................. G09G 3/32
[52] U.S. Cl. ................... 340/782; 340/718; 340/815.0 B; 315/169.3
[58] Field of Search ............... 340/762, 766, 767, 768, 340/782, 718, 719, 815.03, 815.1; 313/500; 315/169.3; 357/17, 32

[56] References Cited

U.S. PATENT DOCUMENTS

| | | | |
|---|---|---|---|
| 3,873,979 | 3/1975 | Craford et al. | 340/815.03 |
| 3,887,836 | 6/1975 | Leete | 315/207 |
| 3,940,756 | 2/1976 | Findlay | 340/719 |
| 3,947,840 | 3/1976 | Craford et al. | 340/719 |
| 4,039,890 | 8/1977 | Bailey et al. | 340/719 |
| 4,554,485 | 11/1985 | Yamada | 340/782 |

FOREIGN PATENT DOCUMENTS

| | | |
|---|---|---|
| 2149688 | 6/1972 | Fed. Rep. of Germany . |
| 2942777 | 5/1981 | Fed. Rep. of Germany ...... 340/782 |
| 1359826 | 7/1974 | United Kingdom ........... 340/815.03 |

OTHER PUBLICATIONS

"Chalcogenide Switch Devices", the *Marconi Review*, vol. 35, No. 184, 1972, pp. 24–41.

Primary Examiner—Jeffery A. Brier
Attorney, Agent, or Firm—Larson and Taylor

[57] ABSTRACT

An optical device has a plurality of LED sources distributed at the nodes of a rectangular lattice and solid state bistable electronic circuits associated with each source for delivering a predetermined current to the source responsive to a temporary control signal applied to a now line corresponding to the source and for maintaining it until it is cut off by another signal.

In a modified embodiment, a plurality of LED sources are associated to the same solid state circuit which has a column interface having several outputs connected to respective column lines for delivering signals representative of conditions to be given to the LED sources one row at a time and a row interface having several outputs connected to respective row lines for selecting the row to be controlled. The circuit is again arranged for maintaining each of the LED sources in energized condition after it has been energized by the column interface and until it is cut-off by a specific signal.

10 Claims, 5 Drawing Sheets

OPTICAL DISPLAY DEVICE

This application is a continuation of application Ser. No. 881,897 filed Jul. 3, 1986 now abandoned.

BACKGROUND OF THE INVENTION

1. Field of the Invention

The invention relates to an optical display device having a large number of individual light sources distributed at the nodes of a regular lattice in a matrix arrangement. It is particularly suitable for use in large size (possibly beyond 10 m$^2$) for location in the open air or in front of buildings.

2. Description of the Prior Art

Optical display devices using a matricial arrangement of LEDs and switching circuits have already been proposed. An apparent ultimate in simplicity and ingenuity is achieved in a device (German 2,942,777) where a series arrangement of a LED and a switching element is connected between a row line and a column line. The switching element is of a type which becomes electrically conductive when the voltage across its terminals exceeds a predetermined value and remains conductive until that voltage has decreased under a second predetermined value, lower than the first. The row lines and the column lines are connected to respective interfaces controlling the voltages on the line. However, that approach has a number of drawbacks which render it pratically useless. Each of the interfaces should be constructed for controlling the voltages on the lines at anyone of three different values. The power necessary for operation of the LEDS is transferred on the lines and consequently it is almost impossible to maintain the three voltages required for operation at the necessary level of stability throughout the length of the line whatever the number of LEDs which are energized.

Similar comments are applicable to the other devices in which the light source is controlled and energized by a row line and a column line only, for instance those described in German 2,149,688 (Secretary of State . . . ,) and the Marconi Review, Vol. 35, No. 184, 1972 , pp. 24–41 "Chalcogenide switching devices".

SUMMARY OF THE INVENTION

It is a first object of the invention to provide an optical display device using LEDs as light sources which is improved with respect to the prior art, particularly in that the problems associated with the voltage variations depending upon the number of LEDs which are energized are attenuated to a large extent. For that purpose, there is provided an optical display device having a plurality of LED sources distributed at the nodes of a rectangular lattice, solid state bistable electronic circuit means associated with each source for connecting said source to an electric supply responsive to a temporary control signal applied to a row line corresponding to said source and to maintain said source connected to said power supply until a cut-off signal is applied to said circuit means through said column line and row line.

A first embodiment of the invention is particularly suitable for use with display dievices of moderate size, not exceeding some square meters. In that arrangement, the circuit means associated with each source consist of a solid state bistable electronic component such as a thyristor which may be switched to a conductive condition by a signal applied on the associated column and row while the corresponding row line is at a first predetermined value, cut-off of all thyristor in a row being obtained by lowering the row voltage at or under a second predetermined value.

In that arrangement, two voltages only are used on the column lines and signal levels only are used on the column lines which consequently do not carry power currents. On the other hand, the currents necessary for energizing the LEDs flow along the row lines. The attendent disadvantage as regards stability of the voltage is however quite limited, since there is no risk of undesirable switchings and one of the levels corresponds to cut-off, that is to the absence of current flow.

While the effect of the power consumption of the LEDs on the voltage is quite limited, it may be of trouble when very large size display panels, including tens of thousands of LEDs, are to be constructed. Then, it is of advantage to use another embodiment of the invention, providing substantially complete independence of the current and voltages. In that arrangement, the circuit means associated with each source are implemented as integrated circuits each controlling $2^k$ LEDs (k being a predetermined integer) distributed around the physical location of the respective integrated circuit and the column lines corresponding to a same integrated circuit are grouped to provide addressing.

It may be seen that the circuit directly associated with the LED fulfils two purposes: it provides storage of the information for an indefinite period and constitutes an interface between the light source and the power supply.

Whatever the embodiment, the device may be operated with simultaneous control of all light sources in a same row. The rows may be controlled in succession or alternate control of even an uneven rows may be used.

A panel according to the invention may be used for displaying graphics or TV images. Each light source may comprise one LED only or a plurality of LEDs having different emission wavelengths, making it possible to provide color displays. It is also possible, and of advantage when TV images are to be displayed, to provide each LED with means capable of delivering, responsive to an appropriate command, anyone of a plurality of energizing currents. Then, brightness control of each source may be obtained at a number of levels sufficient for acceptable restitution of TV images or, more generally, of images obtained by raster scan. Then, all pixels in a same scanning line may be stored in a row shift register and used for controlling the LEDs in a respective row during the row blanking period of the TV signal.

The invention will be better understood from the following description of embodiments given by way of examples only.

DESCRIPTION OF PREFERRED EMBODIMENTS

Figure 1:
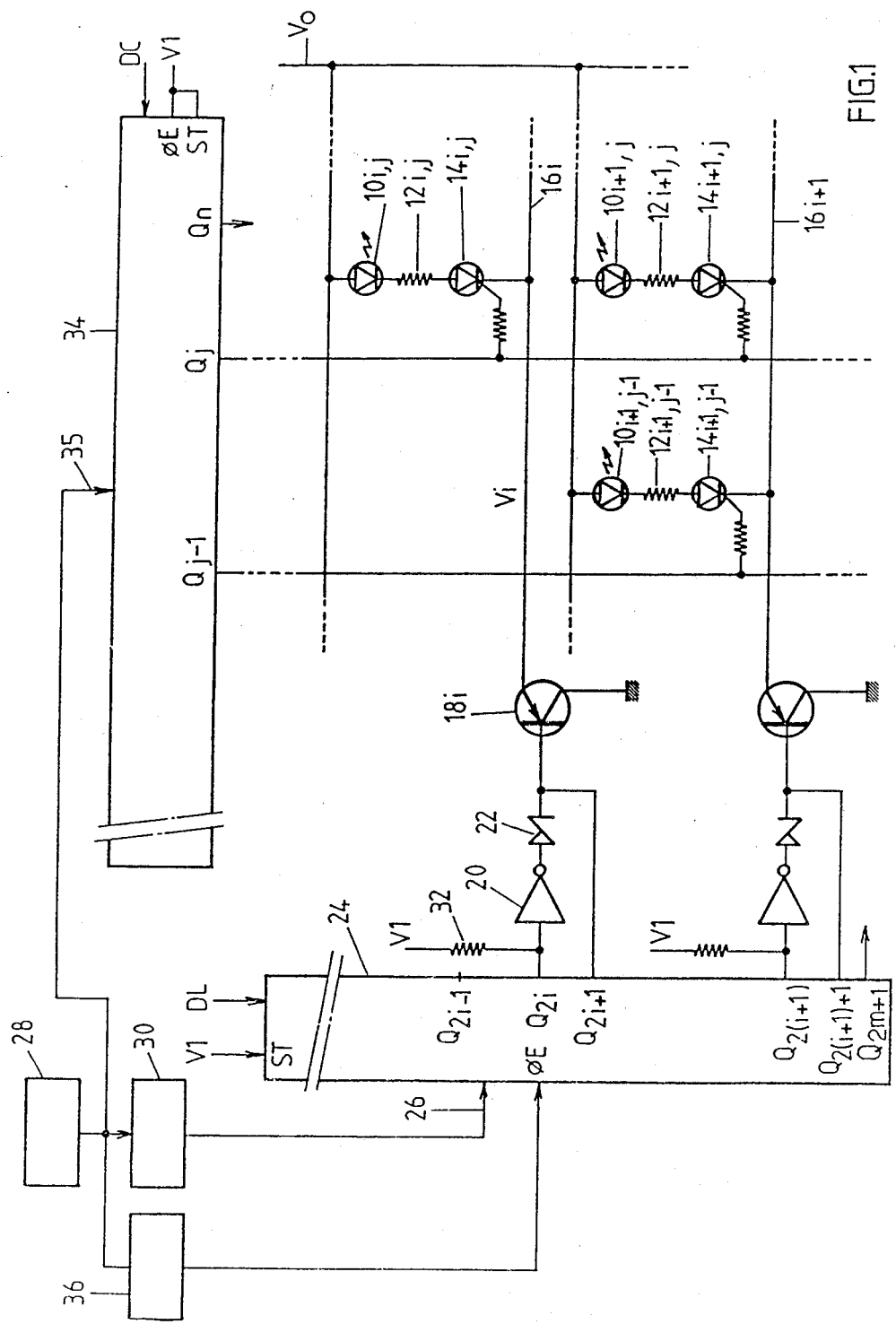
FIG. 1 is a schematic diagram illustrating part of a device according to a first embodiment of the invention.

Referring to FIG. 1, a display to device may be considered as having m.n light sources (m and n being integers) three of which only are represented at $10_{i,j}$; $10_{i+1,j}$ and $10_{i+1,j-1}$. Each source consists of a LED which is continuously connected to a D.C. power source at voltage $V_O$ (12 Volts for instance). Each LED has a respective supply circuit comprising a resistor 12 in series relation with a switching component, consisting of a thyristor 14. As illustrated, the device is for controlling all LEDs in a same row at a time. Then, all thyristors 14 of a same row are connected to a common control line $16_i$, $16_{i+1}$, ..., whose voltage $V_i$, $V_{i+1}$, ... may be brought to either of two predetermined values. One of the values is equal to $V_O$ and the other value $V_R$ is so selected as to maintain the thyristors in conductive state after and if they have been triggered. It will be appreciated that the overall brightness of the device may be adjusted in a relatively broad range by adjusting the value of $V_O$, while this is not possible in a prior art device as defined above. Such brightness control is of particular advantage for open air display panels where it may be preferable to have different brightness during day and at night.

Control of the voltage applied to the row lines is by a row switching circuit 24 and m individual output circuits. All output circuits have the same construction. The output circuit associated with row line $16_i$ for instance includes a switching transistor $18_i$ whose emitter is connected to the row line $16_i$ and whose collector is grounded. Control of the base bias is achieved from two successive outputs $Q_{2i}$ and $Q_{2i+1}$ of circuit 24. For that, the base is directly connected to output $Q_{2i+1}$ and it is connected to output $Q_{2i}$ by a series arrangement of an inverter 20 and a threshold element 22 (for instance a Zener diode). The input of inverter 20 is also connected, via a resistor 32, to a logic level $V_1$ common to all digital components of the device. The threshold element 22 is selected for the base bias of the respective transistor $18_i$ to be such that the voltage $V_i$ on the row line $16_i$ has the value $V_R$ (6 Volts for instance) for a purpose which will appear later, when referring to operation.

The switching circuit 24 may consist of a shift register whose clock input 26 receives a signal derived from a common time base 28 or from a microprocessor when such a component is used for general control of operation. The common time base 28 will typically be at the scanning frequency of successive pixels in a row (for instance the number of pixels of the TV image to be represented on the display device) and then the clock signal applied on input 26 will be derived from 28 by a circuit 30 comprising a divider and a monostable flip-flop. A validation input OE of circuit 24 receives the output of a scanning control circuit 36 whose function and operarion will appear later.

Control of the voltages of the column lines may similarly be achieved by a circuit 34 essentially comprising a shift register. The output of the time base 28 is directly applied to the clock input of register 34. The strobe inputs of registers 24 and 34 are continuously set at the logic level $V_1$ for being continuously active. The validation input OE of register 34 is also continuously at the logic level $V_1$.

The device as described operates as follows.

A reset circuit (not shown) may be provided for resetting to zero all positions in registers 24 and 34 when the supply voltage is turned on. Then, the initial logic levels at all outputs Q are equal to 1, since there is generally an output transistor which is connected in a common emitter arrangement, with the collector in open circuit. On each row line 16, the voltage is equal to a predetermined value $V_R$, which will be called "state storage voltage". The difference $V_O - V_R$ is selected for maintaining those thyristors 14 which have been triggered to conduction in conductive state, even if the trigger bias voltage is removed.

Figure 2:
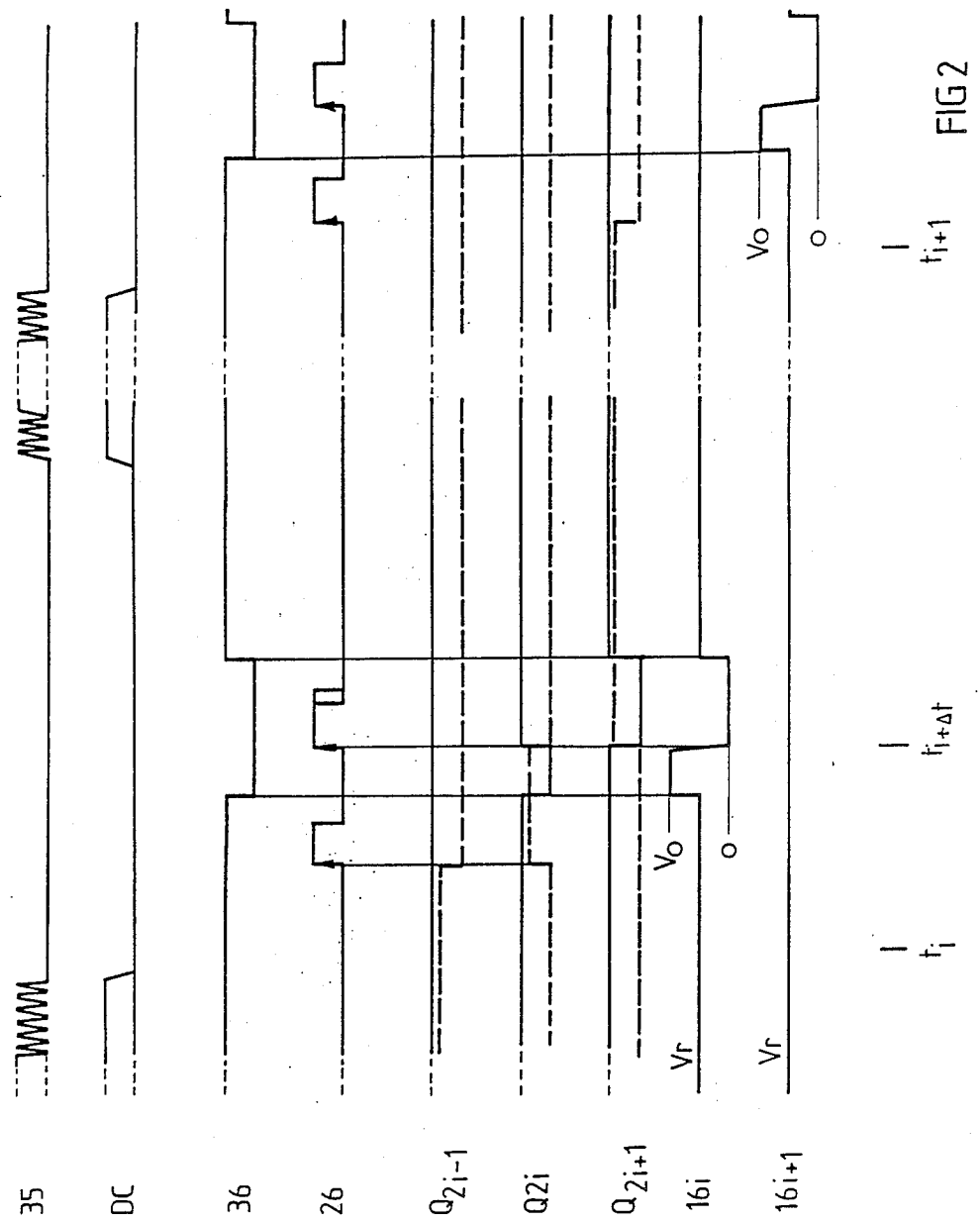
FIG. 2 is a time diagram indicating the shapes of the signals which appear at several locations in the device of FIG. 1

All sources of a same row are controlled at the same time and the rows are controlled in succession. Referring to FIG. 2, there is shown a time diagram corresponding to row $16_i$, where the various voltages and commutations are indicated as curves each identified with a reference corresponding to the location bearing the same reference in FIG. 1.

During the time interval which terminates at time $t_i$, the data corresponding to row $16_i$ are serially introduced into the register 34, via the data input DC, at a frequency which is determined by the signal applied to input 35. The data consist of 0s and 1s which may be derived from a source which may be quite conventional in nature. Finally, all positions in register 34 are loaded with 0s and 1s corresponding to the distribution between light sources to be lighted and sources to be left deenergized.

Then, the register 24 operates under the control of circuits 36 and 30 for reproducing the distribution stored in register 34 in the light source connected to row line $16_i$. The circuit 30 is provided for delivering a first clock pulse on input 26 for switching the flip-flops located at positions numbered $2i-1$ and $2i$ of the register (as indicated by dot lines in FIG. 2). The circuit 36 is synchronized with the time base 28 so that a transition appears on input OE only after the clock pulse which changed the condition of the flip-flops numbered $2i-1$ and $2i$, for avoiding addressing the preceding row line $16_{i-1}$.

The transition signal from circuit 36 is used to switch output $Q_{2i}$ to the low level, which may be considered as the complement of the level already stored in the corresponding flip-flop and to disable (render nonconductive) the transistor $18_i$. Then voltage $V_i$ takes again the value $V_O$ and all light sources connected to row line $16_i$ are turned off.

In response to the next clock pulse, at time $t_i + \delta t$, the condition of the flip-flop numbered $2i+1$ is inverted and a low logic level appears on output $Q_{2i+1}$. Transistor $18_i$ is switched into saturated condition and the total voltage $V_O$ is applied across the terminals of each cascaded arrangement of a LED $10_i$, a resistor 12 and a thyristor (or more generally a SCR) 14. The parallel outputs of register 34 simultaneously apply voltages which have either of two control levels to the triggers of the respective thyristors, one of the levels corresponding to switching into conductive state, the other to unchanged non-conductive condition.

Last, upon return of the validation input OE of the register 24 to the initial condition, with the two outputs $Q_{2i}$ and $Q_{2i+1}$ now at the high level, the voltage delivered by the transistor $18_i$ comes back to level $V_R$.

The operation which has just been described is not the only one possible. Other types of control, using components different from those illustrated in FIG. 1 may be used.

The device may be used for displaying a TV image. For that purpose, it is associated with a source which delivers a raster scan type signal, with each pixel having either of two levels. The duty ratio of the light sources (ratio between the time during which a source is lighted and the total cycle time) and the frequency may be sufficient for accepting a scanning frequency of 50 or 60 Hz. The circuit whose output is applied on input DC of register 34 may belong to a TV receiver, a video camera or a videotape recorder.

Figure 3:
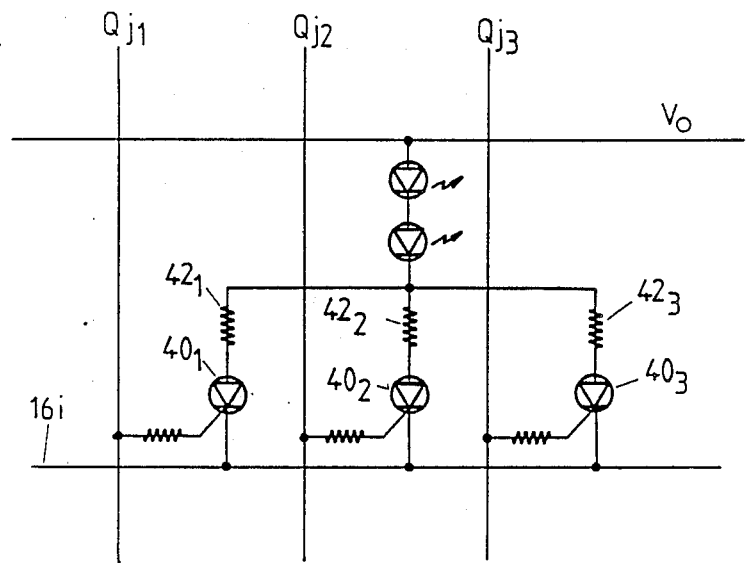
FIG. 3 is a representation of one of the sources of a device according to a modified embodiment, wherein each source may be given anyone of eight brightness values.

As already indicated, each source and its associated switching circuit may be arranged for providing a plurality of brightness levels, among which a selection may be made. In the embodiment of FIG. 3, each source comprises a series arrangement of two LEDs. The two LEDs may be identical and deliver light having the same wavelength or they may be of types providing different wavelengths (red and green for instance) whose combination provides a third color. As illustrated in FIG. 3, each component associated to a light source comprises three thyristors $40_1$, $40_2$ and $40_3$ connected in parallel relation. Each thyristor is in series relation with a resistor $42_1$, $42_2$ or $42_3$. The resistors may typically have values which are in geometrically increasing proportions. Then, it will be possible to provide eight different brightness levels. Generally, each resistor has a value which is double from that of the preceding one. Each column, for instance column j, will have three column lines $Q_{j1}$, $Q_{j2}$ and $Q_{j3}$ and the data corresponding to each point of the lattice will consist of three bits each applied to one of the three column lines.

With such an arrangement, black and white TV images may be reproduced with a quantization which is less rough than in the arrangment of FIG. 1.

When a polychromatic display is necessary, each light source may include a plurality of light emitters independently controlled and delivering different wavelengths. For instance, each source may consist of two optical emitters which provide a selection between three colours.

The arrangement as described in FIGS. 1 and 3 may be implemented in different ways, for instance in hybrid thick layer technology.

Figure 4:
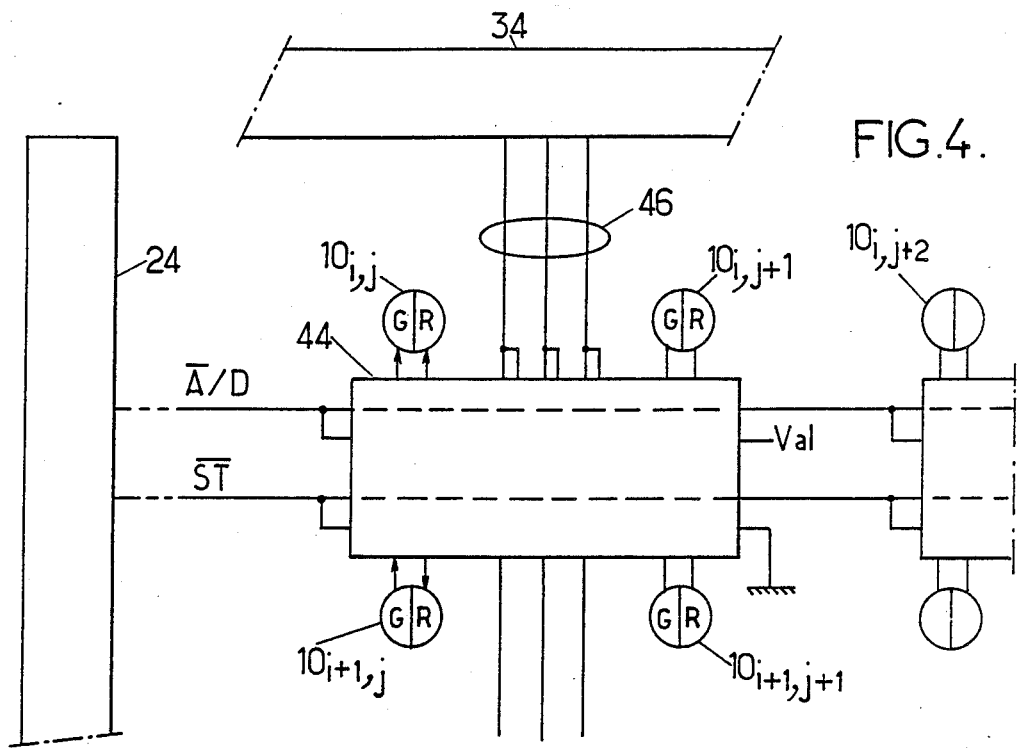
FIG. 4 is a schematic representation of part of a device according to another embodiment of the invention.

Turning now to FIG. 4, a schematic representation of one of the circuits each associated with four bicolor LEDs in a modified embodiment is given. Each LED 10 has in fact two junctions and the two junctions are controlled separately by the circuit 44.

The functions to be fulfilled by circuit 44 will first be described with reference to FIG. 4 before the arrangement of the circuit is detailed.

The circuit 44 is constructed for applying a current which may be selected among a plurality of different current values to each of the light emitting diodes. It will be assumed that the circuit is arranged for delivering anyone of eight current values, each identified by a different three bit number, to each of the junctions of four two-colour LEDs 10. Such values are in a predetermined mutual relationship and represent for instance 100%, 0% and intermediate percentages of a predetermined maximum value. The circuit is further arranged for authorizing adjustment of that maximum current value, thereby permitting adjustment of the overall brightness of the display depending upon the ambient light. Since in addition the brightness of a LED for a same injected current may be different in the red and the green spectra, it may be of advantage to have maximum current values which are different for the green junction and the red junction.

As illustrated in FIG. 4, each circuit 44 is arranged for having sixteen pins only, which renders it necessary to use sequential control to some extent. However, parallel control of all functions would be possbile with a greater number of pins.

Referring to FIG. 4, each circuit 44 has a ground connection and a connection to a supply voltage Val (typically 5 Volts if there is one LED per source). It further includes a terminal (not shown) connected to the ground through a precision resistor for reference purposes. The circuit is for controlling four bicolor LEDs, in two successive rows and columns, in response to signals received from interfaces 24 and 34. Such signals include row signals and column signals.

As illustrated, the column signals are delivered on the three wires of a data and address bus line 46 which is used for addressing each source in turn (which requires two bits for identifying one of the diodes 10 and an additional bit for identifying green or red) and delivering the respective data. The data consist of one of eight brightness (or current) values.

The row data are delivered on two wires $\overline{A}/D$ and $\overline{ST}$. The first wire is for indicating whether the word present on bus line 46 is in the nature of an address or a data. The wire $\overline{ST}$ carries strobe signals.

The predetermined current value may be modified at intervals and that may be done by delivering two successive addresses in succession on the data and address bus line 46 (the fact that they are addresses is identified by maintaining line $\overline{A}/D$ at the low logical level for two successive cycles). Three different address codes may be used for authorizing simultaneous adjustment of the maximum current, adjustment of the "red" maximum current and adjustment of the "green maximum current" respectively.

Figure 5:
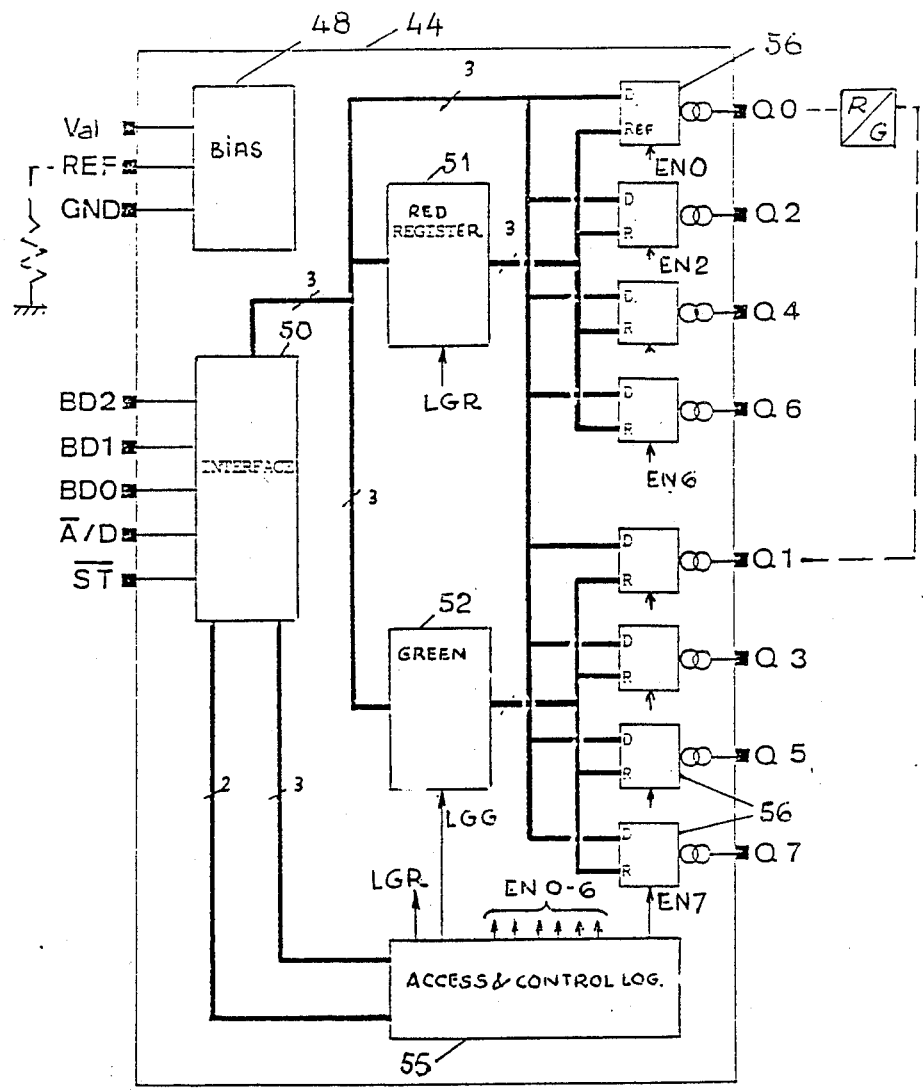
FIG. 5 is a block diagram of one of the integrated circuits (ICs) used in the embodiment of FIG. 4.

The internal arrangement of circuit 44 may be as illustrated in FIG. 5. The circuit comprises a polarization unit 48 which delivers the necessary voltages from the reference value and the supply voltage Val. The three wires BDO, BD1 and BD2 of bus line 46 and the row lines $\overline{A}/D$ and $\overline{ST}$ are connected to an interface 50 for impedance adaptation having Schmitt triggers. It will be assumed that BDO represent the LSB and BD2 the MSB of the word applied to bus line 46.

Two identical registers 51 and 52 are provided for storing predetermined maximum values of the currents, respectively for the red and green emitting junctions. Each three bit signal corresponding to BDO, BD1 and BD2 applied to the registers by bus line 54 is identified by the registers as an address or a data depending upon the level of the respective signal applied on the register by an access control logic 55. Line 54 is also connected to eight current generators 56 each feeding one of the junctions via respective terminals Q0, Q2, Q4 and Q6 (red junctions) and Q1, Q3, Q5 and Q7 (green junctions). The current generators may be conventional in nature. They receive an information representing the predetermined maximum current from the registers 51 and 52 via respective lines 58 and 60. Such current generators are identified as RP0, ..., RP7 respectively and they receive respective strobe or enable signals EN0, ..., EN7 from the access control logic 55 which decodes the information $\overline{A}/D$ and ovs/$\overline{ST}$/.

Figure 6:
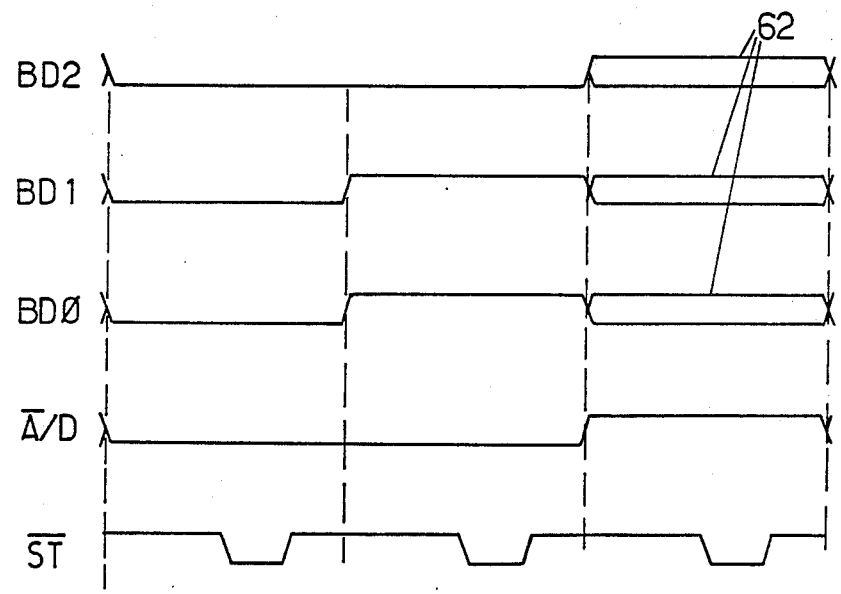
FIG. 6 is a diagram illustrating the wave forms at different locations in the device of FIG. 5.

Assuming that a low logic level on $\overline{A}/D$ indicates that the information given by bus line 46 is an address, control of both registers 51 and 52 for adjusting the maximum current value at a same level in the two registers may be according to the time diagram of FIG. 6. For indicating that the predetermined maximum current value will be delivered, the $\overline{A/D}$ line is maintained at the low level for two successive write cycles (fourth line in FIG. 6). The two registers 51 and 52 are simultaneously addressed by applying the word 000 and then 001 on bus line 46 if the same value is to be written. Writing occurs when the $\overline{ST}$ line is at the low logical level, the use of strobe periods providing a better reliability than a transition edge. During the third cycle, at 62, the predetermined maximum value of the current is delivered and stored as a three bit number in both registers.

Access to the "red" register 51 only and to the "green" register 52 only may be made by using the address words 100, 111; and 111, 110, respectively, for example.

After the predetermined maximum value has been stored, individual control of each light emitting junction may be made by addressing each junction in succession during a first cycle (with line A/D at the low level) and then indicating the current level among eight levels (with $\overline{A/D}$ at the high level).

While there will generally be no advantage in providing an integrated circuit for less than four bicolor LEDs, the number of individual light sources associated with one circuit may be considerably increased. Since at the present time no diodes with more than two different wavelengths are available, trichrome panels may be designed using a bicolor LED and a separate monochrome LED. Eight sources will typically be associated with an integrated circuit located close to the center of the area covered by the LEDs. The integrated circuits will typically be of the I$^2$L type, while CMOS circuits may be used when a high degree of accuracy is not required from the current generators and for the brightness levels.

We claim:

1. An optical display device having:
   a plurality of LED light sources distributed in rows and columns at the nodal points of a rectangular array, each of said light sources having two electrodes one of which is continuously connected to a DC power source common to all said light sources providing a predetermined constant voltage V0,
   a plurality of row lines each connected to the other electrodes of all of said light sources of a same one of said rows through respective thyristors, each thyristor being switchable to a conductive condition,
   a plurality of column lines each connected to triggering inputs of all thyristors of a respective one of said columns and connected to a control circuit for applying voltages having either of two values to said column lines, and
   circuit means for applying to each of said row lines, in succession:
      a first predetermined voltage having a level causing switching to a conductive condition of those thyristors in the respective row which receive a voltage having a predetermined one of said two values,
      a rest voltage maintaining the thyristors in the respective row in unchanged condition, and
      a second predetermined voltage causing cut-off of all thyristors in the respective row.

2. A device according to claim 1, wherein said circuit means comprise a plurality of thyristors mutually connected in parallel relation, each delivering a predetermined current to said LED light source when in conductive condition, all connected to a same power supply and triggerable into conductive condition independently from each other.

3. A device according to claim 3, wherein all thyristors are identical and the thyristors associated with a same one of said LED light sources are in series with resistors of different values.

4. A device according to claim 1, wherein each said LED light source comprises at least two LEDs having different light emission wavelengths and each in series with a respective one of said thyristors.

5. An optical display device having:
   a pluraltiy of LED light sources distributed in rows and columns at the nodal points of a regular lattice;
   a plurality of solid state circuits individually connected to a LED light source energization electric power supply and each opeŕatively associated with a respective set of k said LED light sources (k being an integer) for individual control of the energization of said LED light sources, each of said solid state circuits having a plurality of current generators each for delivering current to one of the k light sources of the associated set;
   a column interface having a plurality of outputs connected via respective column lines to said solid state circuits for delivering condition signals representative of conditions to be given to said LED light sources one row at a time, said column lines constituting bus lines each for individually addressing the k light sources of the associated set and providing data representing the electric current values to be delivered by the respective current generators; and
   a row interface having a plurality of outputs connected via respective row lines to said circuits for selecting one row to be controlled at a time among said rows, said row lines comprising at least a strobe line per circuit,
   said solid state circuits being arranged for maintaining each of said LED light sources in energized condition after it has been energized by said column interface until a new condition signal is applied to the respective solid state circuit,
   wherein each of said solid state circuits comprises additional means for adjusting a maximum value of the currents delivered by said current generators in response to data delivered by said row and column lines to all said circuits at the same time and wherein said data representing the electric current values identify a percentage of said maximum value.

6. An optical display device having:
   a plurality of LED light sources distributed in rows and columns at the nodal points of a regular lattice;
   a plurality of solid state circuits individually connected to a LED light source energization electric power supply and each operatively associated with a respective set of k said LED light sources (k being an integer) for individual control of the energization of said k LED light sources, each of said solid state circuits having a plurality of current generators each for delivering current to one of the k LED light sources of the associated set;

a column interface having a plurality of outputs connected via respective column bases to said solid state circuits for delivering condition signals representative of conditions to be given to said LED light sources and addresses each of said buses for individually addressing the k light sources of the associated set and providing data representing the electric current values to be delivered by the respective current generators and each of said buses having a number of wires just sufficient for providing either address or data information; and a row interface having a plurality of outputs connected via respective row lines to said circuits, each of said row lines comprising at least a strobe line and a data/address selection wire;

said solid state circuits being arranged for maintaining each of said LED light sources in unaltered energized condition after it has been energized by said column interface until a new condition signal relating to said LED light source is applied to the respective solid state circuit.

7. An optical display device having:

a plurality of LED light sources distributed at the nodal points of a regular lattice;

a plurality of solid state circuit means distributed in rows and columns, individually connected to an electric power supply and each having a set of addressable outputs each associated with one LED light source in a respective set of said LED light sources for individual control of the energization of each of said LED light sources in the respective set;

a column interface having a plurality of outputs, each output being connected via a respective column bus to all solid state circuit means of a same column and said outputs simultaneously delivering, on all said column buses, either condition signals each representative of conditions to be given to one of said LED light sources at a time or address signals identifying said one of said LED light sources in the set associated with the solid state circuits of one row;

a row interface having a plurality of outputs connected via respective row lines to said circuit means for selecting one row of said solid state circuit means at a time and for indicating whether the signals on the column buses are condition signals or addresses;

said solid state circuit means being arranged for maintaining each of said LED light sources in unchanged condition after it has been energized responsive to one said condition signal delivered by said column interface until a new condition signal directed to the respecitve LED light source is applied to the respective solid state circuit means;

whereby said addresses and condition signals are time-multiplexed on said column buses and the LED light sources of a same one of said sets are controlled in time sequence.

8. A device according to claim 7, wherein each of said LED sources comprises at least two LED junctions emitting at different wavelenghts and each of said circuits comprises different current generators feeding the different LED junctions.

9. An optical display device having:

a plurality of electrically energized light sources distributed at the nodal points of a regular lattice;

a plurality of solid state circuits distributed in rows and columns of a matricial array, individually connected to a light source energization electric power supply and each operatively associated with a respective set of k said light sources (k being an integer greater than 1) for individual control of the energization of said k light sources, each of said solid state circuits having a plurality of current generators each for delivering current to one of the k light sources of the associated set;

a column interface having a plurality of digital outputs connected via respective column buses to said solid state circuits for delivering condition signals representative of conditions to be given to said light sources and addresses, each of said buses for individually addressing the k light sources of the associated set and providing data representing the electric current values to be delivered by the respective current generators and each of said buses having a number of wires just sufficient for providing either an address or data information; and a row interface having a plurality of binary outputs connected via respective row lines to said circuits, each of said row lines comprising at least a strobe line and a data/address selection wire;

said solid state circuits being arranged for maintaining each of said light sources in unaltered energized condition after it has been energized by said column interface until a new condition signal relating to said light source is applied to the respective solid state circuit.

10. An optical display device according to claim 9, wherein each of said light sources comprises a plurality of light emitting elements emitting at different wave lengths and each energized by a separate current generator through a separate one of the addressable outputs of the respective solid state circuit means.

* * * * *